Sept. 8, 1931.   A. V. GEARY   1,822,808
HYDRAULIC POWER PLANT
Filed June 15, 1929   3 Sheets-Sheet 1

Albert Victor Geary
INVENTOR
BY Victor J. Evans
ATTORNEY

Sept. 8, 1931.  A. V. GEARY  1,822,806
HYDRAULIC POWER PLANT
Filed June 15, 1929  3 Sheets-Sheet 2

Albert Victor Geary
INVENTOR
BY Victor J. Evans
ATTORNEY

Sept. 8, 1931.  A. V. GEARY  1,822,806
HYDRAULIC POWER PLANT
Filed June 15, 1929  3 Sheets-Sheet 3

Albert Victor Geary INVENTOR
BY Victor J. Evans
ATTORNEY

Patented Sept. 8, 1931

1,822,806

UNITED STATES PATENT OFFICE

ALBERT VICTOR GEARY, OF WESTVILLE, NEW HAMPSHIRE

HYDRAULIC POWER PLANT

Application filed June 15, 1929. Serial No. 371,161.

This invention relates to a hydraulic power plant, the general object of the invention being to provide a float operated by tide or wave motion or by any rise and fall of water level, natural or artificial, and a weighted body connected therewith for accelerating the downward movement of the float, with means for transmitting the upward movement of the float and the downward movement of the body to a driven member.

Another object of the invention is to provide means for imparting motion to the body during abnormal movements of the float which is greater than that imparted to the body under normal movements of the float, whereby energy is stored and is released during subnormal action of the float, which acts to increase the period of time the driven member receives power from the body and thus compensates for the subnormal motions of the float.

A further object of the invention is to provide governor means for controlling the compensating action of the device.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
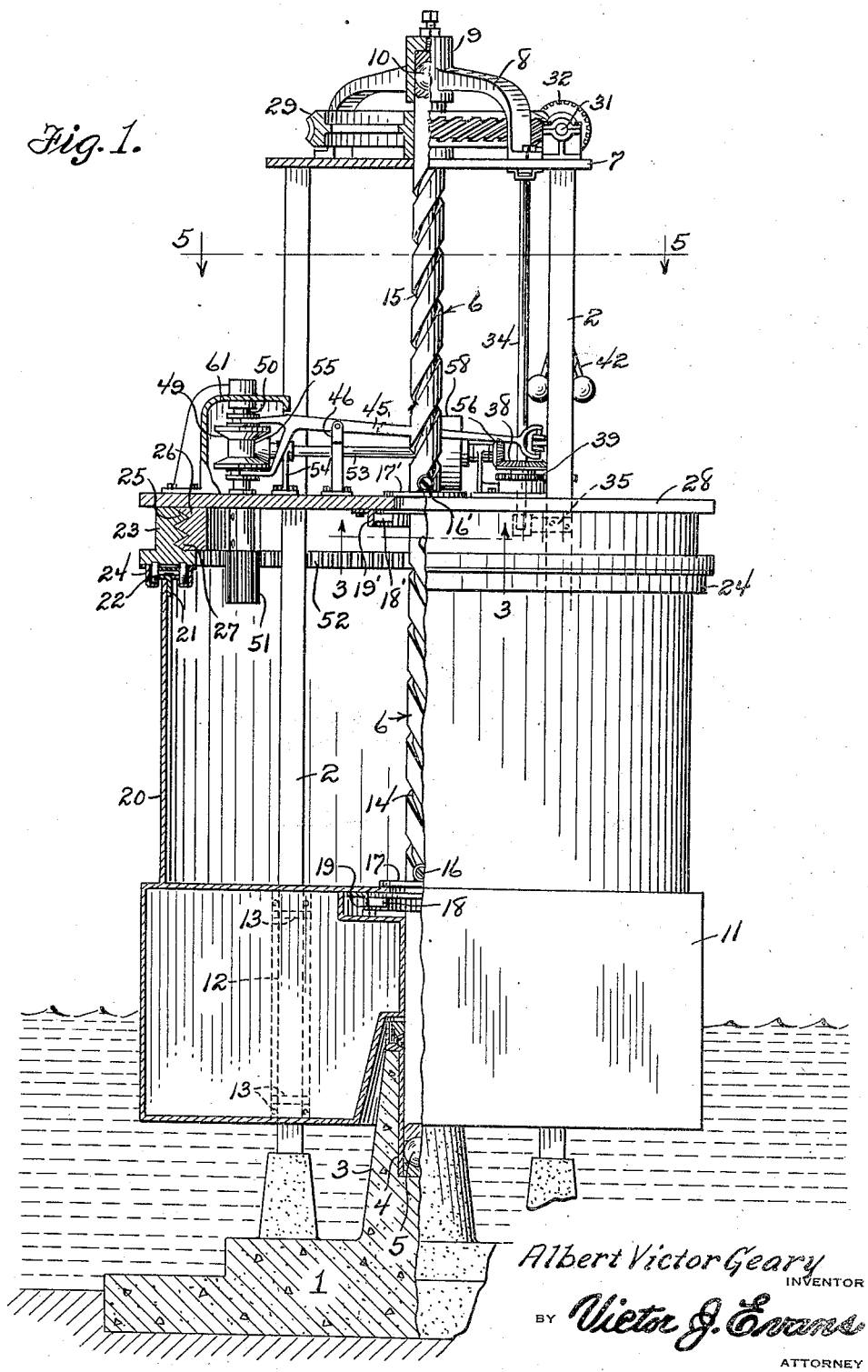
Figure 1 is an elevation, partly in section, showing one way of carrying out the invention.
Figure 2:
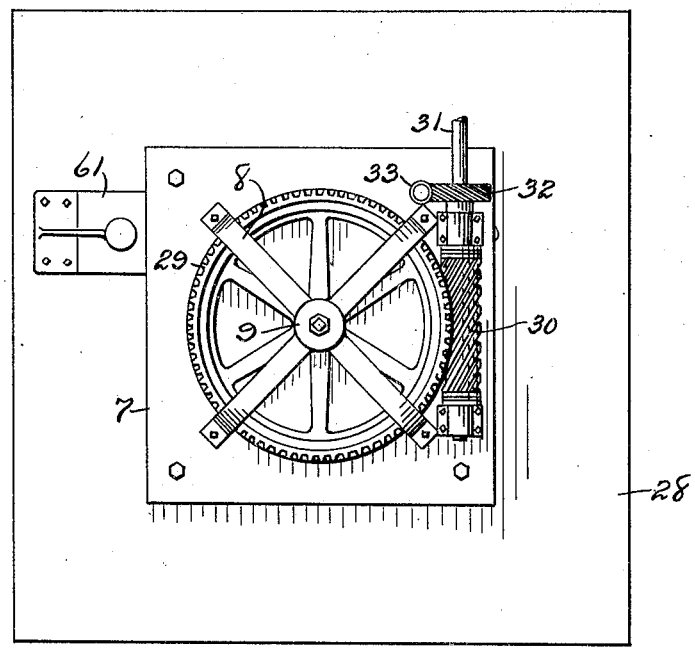
Figure 2 is a top plan view.
Figure 3:
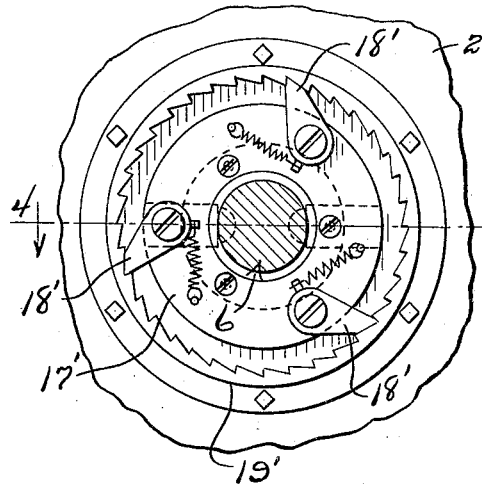
Figure 3 is a section on line 3—3 of Figure 1.
Figure 4:
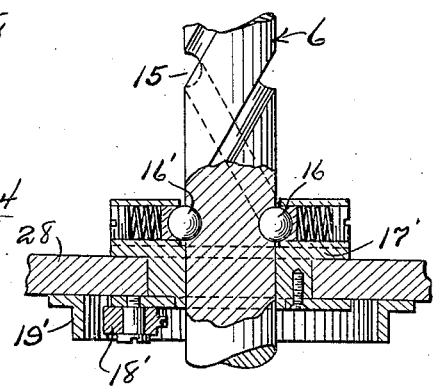
Figure 4 is a section on line 4—4 of Figure 3.
Figure 5:
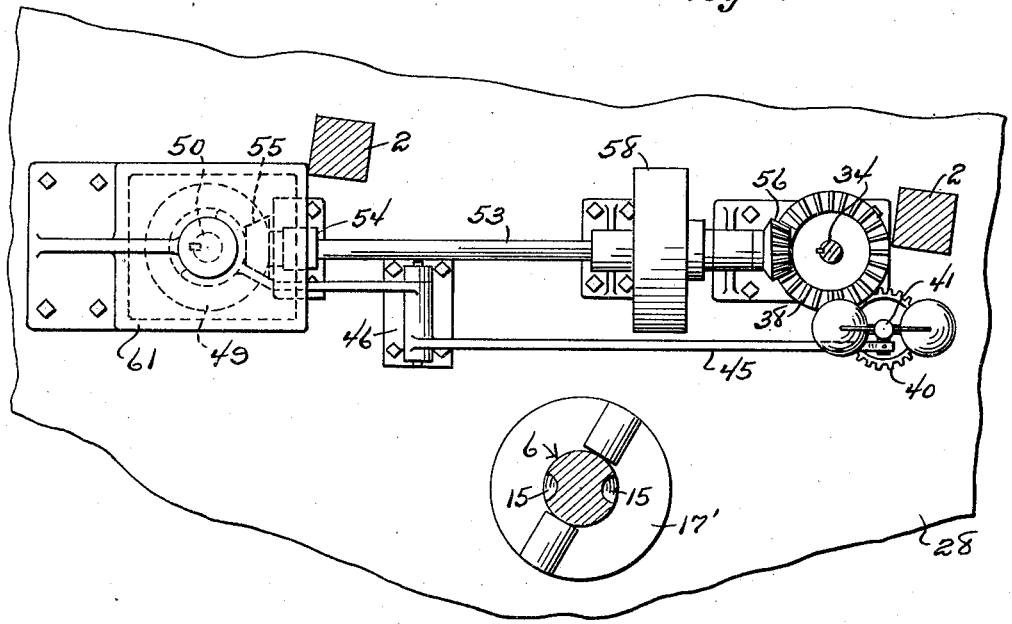
Figure 5 is a section on line 5—5 of Figure 1.
Figure 6:
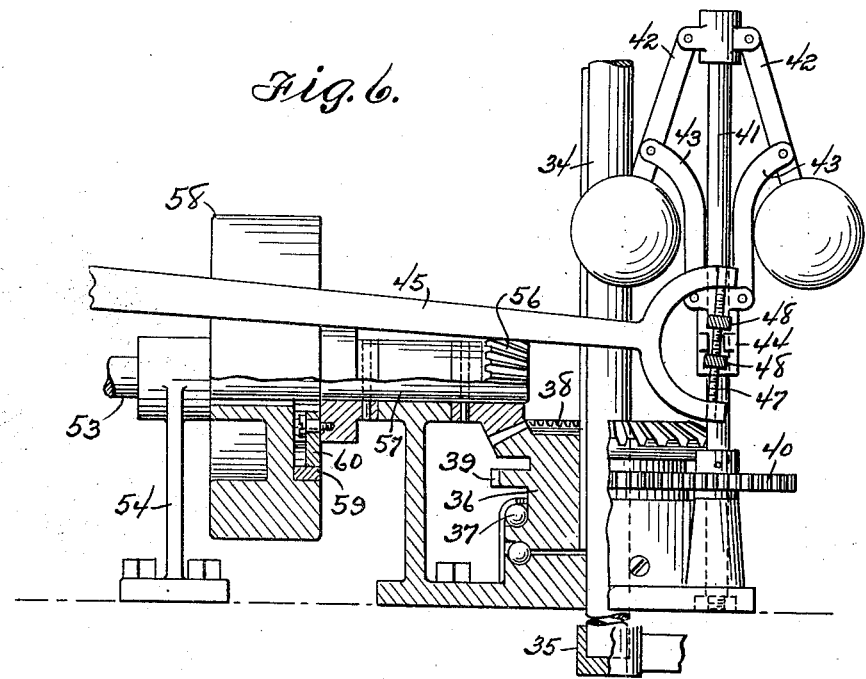
Figure 6 is a view, partly in section, of the governor controlled means.

In these views, the numeral 1 indicates a base placed in a body of water, the level of which changes, either through artificial means or by natural means, such as, in the latter case, by the waves and tides. This base supports the lower ends of the posts 2 and the base has a central projection 3 thereon which is socketed to receive the bearing sleeve 4 and the ball bearing 5 for the lower end of the shaft 6. A cap plate 7 is connected with the upper ends of the posts 2 and the shaft 6 passes through said plate and a spider 8 is fastened to the plate and carries the bearing part 9 containing the ball bearing 10 for the upper end of the shaft. As will be seen, the ball bearings act as thrust bearings for the shaft.

A float 11 has a central passage therein through which the shaft passes, the passage having an enlarged lower end for receiving a part of the projection 3 when the float is in lowered position, as shown in Figure 1. The float is also formed with the passages 12 through which the posts pass, rollers 13 being arranged in said passages for preventing friction between the posts and the float during the movement of the float.

The lower part of the shaft is formed with the spiral grooves 14 and the upper part with the oppositely arranged spiral grooves 15. Spring pressed detents 16 engage the grooves 14 and these detents are carried by a rotary member 17 rotatably arranged in the top of the float and through which the shaft passes, the lower part of the member carrying the spring pressed pawls 18 for engaging the ratchet ring 19 attached to the under face of the top of the float. These parts are so arranged that as the float moves upwardly the pawls will engage the ratchet ring and thus lock the rotary member 17 to the float so that the upward movement of the float will cause the detents 16 to rotate the shaft 6. On the downward movement of the float, the pawls will ratchet over the ring and thus the member 17 will simply rotate and the detents will move down the grooves in the shaft without imparting movement thereto. Thus it will be seen that the float will rotate the shaft on the upward movement of the float, but will not actuate the shaft on its downward movement.

A cylinder 20 has its lower end fastened to the top of the float and a flange 21 is connected with the top of the cylinder, said flange carrying the rollers 22 on which is seated a ring member 23 which is provided with the depending flanges 24 having their lower edges bent over the ends of the rollers so that the ring is rotatably supported on the cylinder and is so connected therewith that the ring member must follow the movements of the cylinder. This ring member is provided with the internal spiral teeth 25 and a second ring member 26 has exterior spiral teeth 27 which engage the teeth 25. A platform 28 is fastened to the ring member 26 and at the center of the platform a rotary member 17' is arranged, which is similar to the member 17 and carries the detents 16' which engage the upper grooves 15, and said rotary member also carries the pawls 18' for engaging the ratchet ring 19' on the under face of the platform. These parts are so arranged that on the upward movement of the platform, the rotary member will simply revolve with its pawls ratcheting over the ratchet ring and the detents moving in the grooves 15 without turning the shaft. On the downward movement of the platform, however, the rotary member 17' will be locked to the platform by the pawls and ratchet ring and thus the detents 16' will cause the shaft to turn in the same direction that the shaft is turned by the upward movement of the float.

A worm gear 29 is fastened to the top part of the shaft 6, above the top plate, and meshes with a worm 30 on the driven shaft 31 having a part journaled on the top plate, whereby the motion of the spiral shaft will be transmitted to the driven shaft. This driven shaft carries a small worm gear 32 which meshes with a worm 33 on the upper end of a vertically arranged shaft 34 journaled in the top plate and in a bracket 35 secured to one of the posts 2 below the platform. The shaft passes through the platform and has splined to its lower part a hub 36 which is rotatably supported on the platform by the anti-friction means 37. This hub is formed with the beveled gear 38 and the gear 39. The latter gear meshes with a gear 40 fastened to the governor shaft 41 having its lower end journaled in the platform. The weighted arms 42 of the governor are connected by the links 43 with the slide 44 on the governor shaft.

A lever 45 is pivoted to the post 46 on the platform and both ends of this lever are forked. The prongs at the long part of the lever carry the threaded shaft 47 on which are placed the adjustable stops or nuts 48 for engaging projections on the slide 44. Thus the movement of the slide by the governor arms will be imparted to the lever and the movement of the lever can be regulated by adjusting the stops or nuts on the shaft 47. The prongs on the short part of the lever engage grooves formed in the ends of the friction spool 49 splined to a vertical shaft 50 passing through the platform and journaled therein. Said shaft 50 has a long pinion 51 on its lower end which meshes with a ring gear 52 on the inner circumference of the ring member 23. A shaft 53 is journaled in the posts 54 on the platform and has a friction cone 55 at one end engaging either part of the friction spool, according to the position the spool has been moved into by the forked lever 45. A beveled gear 56 is loosely arranged on a stub shaft 57 carried by the platform and meshes with the beveled gear 38. This stub shaft is in alignment with the shaft 53 and said shaft 53 carries a fly wheel 58 which carries the ratchet teeth 59 engaged by the pawls 60 on the end of the stub shaft. A housing 61 encloses the spool 49 and the parts associated therewith.

As will be seen, the governor, the gear carrying hub 36, the lever 45, shaft 53, shaft 50 and the parts associated with these parts are carried by the platform and move therewith and act to impart weight to the platform.

As before stated, the upward movement of the float will impart a rotary movement to the shaft 6 in one direction and as the platform raises with the float, the detents of the platform will not act on the shaft. On the downward movement, the float detents will not act on the shaft, but the detents of the platform will rotate the shaft in the same direction that it was turned by the upward movement of the float. Thus the upward and downward movements of the parts will give the shaft a continuous rotary movement in the same direction which is imparted to the driven shaft by the worm gearing. This movement of the driven shaft is transmitted to the shaft 34 by the worm gearing 32 and 33 and the movement of the shaft 34 is transmitted to the governor by the gears 39 and 40 and to the stub shaft 57 by the gears 38 and 56. The stub shaft drives the shaft 53 through the ratchet mechanism 59 and 60. Under normal movements of the float, the governor is driven at such a speed that it will hold the lever 45 in a position with the spool 49 out of engagement with the cone 55 so that the shaft 50 and the pinion 51 will not be rotated.

However, if the float should be raised in an abnormal manner, the greater speed of the shaft 6 would be imparted to the governor and thus cause the weighted arms of the same to swing outwardly and raise the slide to a point where it will move the lever 45 and cause the same to shift the spool 49 downwardly, where its upper flange will engage the cone 55 on shaft 53, which is being driven from the shaft 34. Thus the spool will be rotated to rotate the shaft 50 and its pinion 51 and cause the pinion to rotate the ring member 23, the threads of which, engaging the threads of the member 26, will cause said member 26 to rise and move the platform upwardly a greater distance from the float. Thus energy is stored in the weighted platform and when subnormal movements of the float occur, the governor arms will drop, thus shifting the spool to a point where its lower flange will engage the cone so that the shaft pinion 51 will be driven in a reverse direction to cause the ring members to lower the platform toward its normal position. This will give the shaft 6 more movement than it receives from the downward movement of the platform after the same has been raised by the normal movement of the float, and thus this extra movement of the shaft by the platform will compensate for the loss of movement of the shaft by the subnormal movement of the float. This lowering action of the platform will only continue until the speed becomes normal and the platform will not always get down to its normal or lowest position. It will only go toward that normal position until its force has raised the speed to normal.

At the beginning of the slowing up movement of the shaft 6 by the subnormal movement of the float, there is a possibility of the device stalling before the weight of the platform starts on its downward compensating or bolstering motion. This stalling is avoided by using the fly wheel 58 which gives its shaft considerable momentum and thus starts the initial movement of the ring member 23 by the pinion 51, this movement being continued by the weight of the platform and the parts thereon. The ratchet mechanism enables the fly wheel to act in this manner.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A hydraulic power plant comprising a float, a weighted platform movably connected therewith, a shaft having oppositely arranged spirals thereon, means including means engaging one spiral for directly imparting rotary motion in one direction to the shaft on the upward movement of the float and means including means engaging the other spiral for directly imparting rotary motion to the shaft in the same direction on the downward movement of the platform.

2. A hydraulic power plant comprising a float, a weighted platform movably connected therewith, a shaft, means for directly imparting rotary movement in one direction to the shaft on the upward movement of the float, means for directly imparting rotary movement to the shaft in the same direction on the downward movement of the platform and means for imparting movement to the body relative to the float on abnormal movements of the float whereby the platform will impart a compensating movement to the shaft during subnormal movements of the float.

3. A hydraulic power plant comprising a float, a weighted body, means for rotatably supporting the body from the float, such means including spirally threaded members, a shaft, means for imparting rotary movement to the shaft in one direction on the upward movement of the float, means for imparting rotary motion to the shaft in the same direction on the downward movement of the body, means for imparting movement to one of the spirally threaded members on abnormal movements of the float whereby the body will be raised relative to the float and thus impart a compensating motion to the shaft during subnormal movements of the float.

4. A hydraulic power plant comprising a float, a weighted body, means for rotatably supporting the body from the float, such means including spirally threaded members, a shaft, means for imparting rotary movement to the shaft in one direction on the upward movement of the float, means for imparting rotary motion to the shaft in the same direction on the downward movement of the body, means for imparting movement to one of the spirally threaded members on abnormal movements of the float whereby the body will be raised relative to the float and thus impart a compensating motion to the shaft during subnormal movements of the float, such means comprising a governor, means for operating the same from the shaft, means operated from the shaft for rotating the spirally threaded member and means for controlling the last mentioned means by the governor.

5. A hydraulic power plant comprising a float, a weighted body connected therewith, a shaft having spiral grooves in its lower part and spiral grooves in its upper part, said grooves being oppositely arranged, detents carried by the float and the body for engaging the grooves and oppositely arranged ratchet means carried by the float and body and associated with the detents whereby the float will impart rotary movement to the shaft on its upward movement without moving the shaft on its downward movement and the body will impart rotary movement to the shaft on its downward movement without rotating the shaft on its upward movement.

6. A hydraulic power plant comprising a float, a weighted platform, a member attached to the float and rotatably supporting the platform, a shaft, means for directly imparting rotary movement to the shaft in one direction on the upward movement of the float, means for directly imparting rotary movement to the shaft in the same direction on the downward movement of the platform and means for moving the platform relative to the float during abnormal movements of the float whereby a compensating action will be imparted to the shaft by the platform during subnormal movements of the float.

In testimony whereof I affix my signature.

ALBERT VICTOR GEARY.